United States Patent
Noraas et al.

(10) Patent No.: US 10,035,174 B2
(45) Date of Patent: Jul. 31, 2018

(54) OPEN-CELL RETICULATED FOAM

(71) Applicant: UNITED TECHNOLOGIES CORPORATION, Farmington, CT (US)

(72) Inventors: Ryan B. Noraas, Vernon, CT (US); Steven J. Bullied, Pomfret Center, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 156 days.

(21) Appl. No.: 14/617,291

(22) Filed: Feb. 9, 2015

(65) Prior Publication Data

US 2016/0228913 A1  Aug. 11, 2016

(51) Int. Cl.
| | |
|---|---|
| B22D 25/00 | (2006.01) |
| B05D 1/24 | (2006.01) |
| B22C 7/02 | (2006.01) |
| B22C 9/04 | (2006.01) |
| C08J 9/36 | (2006.01) |
| B05D 3/00 | (2006.01) |
| F01D 5/28 | (2006.01) |

(52) U.S. Cl.
CPC ............... *B05D 1/24* (2013.01); *B05D 3/007* (2013.01); *B22C 7/023* (2013.01); *B22C 9/046* (2013.01); *C08J 9/36* (2013.01); *F01D 5/28* (2013.01); *F01D 5/288* (2013.01); *F05D 2220/36* (2013.01); *F05D 2230/31* (2013.01); *F05D 2240/303* (2013.01); *F05D 2300/43* (2013.01); *F05D 2300/603* (2013.01); *F05D 2300/612* (2013.01); *Y02T 50/672* (2013.01)

(58) Field of Classification Search
CPC ........ B22C 7/023; B22C 9/046; B22D 25/005
See application file for complete search history.

(56) References Cited

U.S. PATENT DOCUMENTS

| | | |
|---|---|---|
| 3,946,039 A | 3/1976 | Walz |
| 4,106,548 A | 8/1978 | Murza-Mucha et al. |
| 4,235,277 A | 11/1980 | Aizawa et al. |

(Continued)

FOREIGN PATENT DOCUMENTS

| | | |
|---|---|---|
| DE | 102004016874 A1 | 10/2005 |
| DE | 102004026959 B3 | 2/2006 |

(Continued)

OTHER PUBLICATIONS

European Search Report for Application No. 16154399.6; dated May 31, 2016.

(Continued)

*Primary Examiner* — Kevin P Kerns
*Assistant Examiner* — Steven S Ha
(74) *Attorney, Agent, or Firm* — Cantor Colburn LLP

(57) ABSTRACT

A foam for use in a lost-foam casting process utilized in the manufacture of a component for a gas turbine engine, the foam having a void fraction less than or equal to ninety five percent, is disclosed. The foam may include a first layer comprising polymer foam having an open-cell structure and a void fraction greater than ninety five percent. A second layer, comprising adhesive, may be adhered to the first layer. A third layer comprising particulate material may be adhered to the second layer.

12 Claims, 9 Drawing Sheets

(56) References Cited

U.S. PATENT DOCUMENTS

| | | | |
|---|---|---|---|
| 4,285,385 A | 8/1981 | Hayashi et al. | |
| 4,537,823 A | 8/1985 | Tsang et al. | |
| 4,568,595 A | 2/1986 | Morris | |
| 4,714,586 A | 12/1987 | Swarr et al. | |
| 4,756,251 A | 7/1988 | Hightower et al. | |
| 4,764,319 A | 8/1988 | Hightower et al. | |
| 4,798,142 A | 1/1989 | Canterberry et al. | |
| 4,808,360 A | 2/1989 | Natori et al. | |
| 4,822,694 A | 4/1989 | Randin et al. | |
| 4,923,830 A | 5/1990 | Everhart et al. | |
| 5,016,702 A | 5/1991 | Ahlers | |
| 5,024,160 A | 6/1991 | Canterberry et al. | |
| 5,042,560 A | 8/1991 | Ahlers | |
| 5,062,365 A | 11/1991 | Canterberry | |
| 5,066,622 A | 11/1991 | Claar et al. | |
| 5,093,678 A | 3/1992 | Muller et al. | |
| 5,127,223 A | 7/1992 | Hightower et al. | |
| 5,231,968 A | 8/1993 | Siefkes | |
| 5,403,790 A | 4/1995 | Clear et al. | |
| 5,520,861 A | 5/1996 | Powell et al. | |
| 5,575,871 A | 11/1996 | Ryoshi et al. | |
| 5,668,188 A | 9/1997 | Whinnery et al. | |
| 5,848,351 A | 12/1998 | Hoshino et al. | |
| 5,881,353 A * | 3/1999 | Kamigata | B01D 39/2034 419/2 |
| 5,951,791 A | 9/1999 | Bell et al. | |
| 6,080,493 A | 6/2000 | Kent | |
| 6,087,024 A | 7/2000 | Whinnery et al. | |
| 6,117,592 A | 9/2000 | Hoshino et al. | |
| 6,189,598 B1 | 2/2001 | Chandley et al. | |
| 6,424,529 B2 | 7/2002 | Eesley et al. | |
| 6,424,531 B1 | 7/2002 | Bhatti et al. | |
| 6,591,897 B1 | 7/2003 | Bhatti et al. | |
| 6,660,224 B2 | 12/2003 | Lefebvre et al. | |
| 6,673,285 B2 | 1/2004 | Ma | |
| 6,840,307 B2 | 1/2005 | Eesley et al. | |
| 6,843,876 B1 | 1/2005 | Kent | |
| 6,857,461 B2 | 2/2005 | Girlich et al. | |
| 7,106,777 B2 | 9/2006 | Delgado et al. | |
| 7,108,828 B2 | 9/2006 | Lefebvre et al. | |
| 7,182,121 B1 | 2/2007 | Viel | |
| 7,401,643 B2 | 7/2008 | Queheillalt et al. | |
| 7,416,667 B2 | 8/2008 | Benachenou et al. | |
| 7,615,184 B2 | 11/2009 | Lobovsky et al. | |
| 7,875,342 B2 | 1/2011 | Smith et al. | |
| 8,225,841 B1 | 7/2012 | Davidson | |
| 8,257,826 B1 | 9/2012 | Zinn et al. | |
| 8,424,585 B2 | 4/2013 | Hansen | |
| 2012/0196147 A1* | 8/2012 | Rabiei | B22F 3/1112 428/613 |
| 2012/0225236 A1 | 9/2012 | Cox | |
| 2013/0040046 A1 | 2/2013 | Hosoe et al. | |
| 2014/0039082 A1 | 2/2014 | Peterson et al. | |

FOREIGN PATENT DOCUMENTS

| | | |
|---|---|---|
| DE | 102004016874 B4 | 4/2007 |
| DE | 102004016874 C5 | 11/2008 |
| EP | 0157974 A1 | 10/1985 |
| EP | 0157974 B1 | 9/1989 |
| EP | 0333944 A1 | 9/1989 |
| EP | 0333945 A1 | 9/1989 |
| EP | 0336023 A1 | 10/1989 |
| EP | 0333945 B1 | 2/1992 |
| EP | 1604756 A2 | 12/2005 |
| EP | 1604756 A3 | 12/2005 |
| EP | 1604756 B1 | 3/2007 |
| EP | 2653379 A2 | 10/2013 |
| GB | 2214275 A | 8/1989 |
| GB | 2214277 A | 8/1989 |
| GB | 2214617 A | 9/1989 |
| GB | 2214277 B | 1/1992 |
| GB | 2260538 A | 4/1993 |
| GB | 2260538 B | 8/1995 |
| WO | 1995011752 A1 | 5/1995 |
| WO | 2010117476 A1 | 10/2010 |
| WO | 2011051106 A1 | 5/2011 |
| WO | 2015009446 A1 | 1/2015 |

OTHER PUBLICATIONS

Note: Only the abstracts for GB2214277B and GB2260538B are publically available, which is submitted herewith for your use; however the patent's published application is also submitted herewith for your review.

* cited by examiner

OPEN-CELL RETICULATED FOAM

FIELD OF THE DISCLOSURE

This disclosure generally relates to open-cell reticulated foam and, more specifically, to open-cell reticulated foam for use in the creation of gas turbine engine fan blades.

BACKGROUND OF THE DISCLOSURE

In order to increase operational efficiency, and thereby decrease fuel consumption, designers of gas turbine engines continually pursue ways to decrease component weight while maintaining resilience necessary for the operation of such engine. Fan blades are no exception.

One way gas turbine engine designers have utilized to reduce fan blade weight is by employing an open-cell reticulated metal foam core enveloped by an outer shell of a resilient second material that forms the airfoil. In one design, the outer shell is manufactured from a metal or metal alloy. In another design, the outer shell is comprised of one or more layers of composite material.

Such fan blade designs are not without complication. The void fraction of the open-cell reticulated foam utilized to manufacture such metal foam is commonly about ninety seven percent. While not necessarily conclusive, data suggests that the ligaments and nodes of metal foams created with the use of such high void fraction open-cell reticulated foams lack the strength and mechanical properties necessary for use in a fan blade. Accordingly, a need exists for modified, open-cell reticulated foams that can be used as a precursor to manufacture open-cell cell reticulated metal foams for a gas turbine engine fan blade. This disclosure is directed toward this end.

SUMMARY OF THE DISCLOSURE

In accordance with one embodiment of the present disclosure, a foam for use in a lost-foam casting process, the foam having a void fraction less than or equal to ninety five percent, is disclosed. The foam may comprise a first layer made of polymer foam having an open-cell structure and a void fraction greater than ninety five percent. The foam may further include a second layer of an adhesive adhered to the first layer. Finally, the foam may include a third layer comprising a particulate material adhered to the second layer.

In a refinement of the foam for use in a lost foam casting process, the foam having a void fraction less than or equal to ninety five percent, the polymer foam may be selected from the group consisting of polyurethane polymer foam, polyvinyl chloride polymer foam, polystyrene polymer foam, polyimide polymer foam, silicone polymer foam, polyethylene polymer foam, polyester polymer foam and combinations thereof.

In another refinement of the foam for use in a lost foam casting process, the foam having a void fraction less than or equal to ninety five percent, the adhesive may be an adhesive polymer selected from the group consisting of acrylic polymer, alkyd polymer, styrene acrylic polymer, styrene butadiene polymer, vinyl acetate polymer, vinyl acetate homopolymer polymer, vinyl acrylic polymer, vinyl maleate polymer, vinyl versatate polymer, vinyl alcohol polymer, polyvinyl chloride polymer, polyvinylpyrrolidone polymer, casein and combinations thereof.

In another refinement of the foam for use in a lost foam casting process, the foam having a void fraction less than or equal to ninety five percent, the particulate material may be selected from the group consisting of wax powder, wood flour, polymer powder and combinations thereof.

In another refinement of the foam for use in a lost foam casting process, the foam having a void fraction less than or equal to ninety five percent, the wax powder may be selected from the group consisting of animal wax powder, vegetable wax powder, mineral wax powder, petroleum wax powder and combinations thereof.

In another refinement of the foam for use in a lost foam casting process, the foam having a void fraction less than or equal to ninety five percent, the polymer powder may be selected from the group consisting of polyurethane polymer powder, polyvinyl chloride polymer powder, polystyrene polymer powder, polyimide polymer powder, polyethylene polymer powder, polyester polymer powder, polypropylene polymer powder and combinations thereof.

In accordance with another embodiment of the present disclosure, a method for manufacturing foam for use in a lost-foam casting process, the foam having a void fraction less than or equal to ninety five percent, is disclosed. The method may include providing polymer foam having an open-cell structure and a void fraction greater than ninety five percent. Then, the polymer foam may be coated with an adhesive. Finally, particulate matter may be applied to the adhesive.

In a refinement of the method for manufacturing the foam for use in a lost-foam casting process, the foam having a void fraction less than ninety five percent, the polymer foam may be selected from the group consisting of polyurethane polymer foam, polyvinyl chloride polymer foam, polystyrene polymer foam, polyimide polymer foam, silicone polymer foam, polyethylene polymer foam, polyester polymer foam and combinations thereof.

In another refinement of the method for manufacturing the foam for use in a lost-foam casting process, the foam having a void fraction less than ninety five percent, the adhesive may comprise an adhesive polymer, and the adhesive polymer may be selected from the group consisting of acrylic polymer, alkyd polymer, styrene acrylic polymer, styrene butadiene polymer, vinyl acetate polymer, vinyl acetate homopolymer polymer, vinyl acrylic polymer, vinyl maleate polymer, vinyl versatate polymer, vinyl alcohol polymer, polyvinyl chloride polymer, polyvinylpyrrolidone polymer, casein and combinations thereof.

In another refinement of the method for manufacturing the foam for use in a lost-foam casting process, the foam having a void fraction less than ninety five percent, the particulate material may be selected from the group consisting of wax powder, wood flour, polymer powder and combinations thereof.

In another refinement of the method for manufacturing the foam for use in a lost-foam casting process, the foam having a void fraction less than ninety five percent, the wax powder may be selected from the group consisting of animal wax powder, vegetable wax powder, mineral wax powder, petroleum wax powder and combinations thereof.

In another refinement of the method for manufacturing the foam for use in a lost-foam casting process, the foam having a void fraction less than ninety five percent, the polymer powder may be selected from the group consisting of polyurethane polymer powder, polyvinyl chloride polymer powder, polystyrene polymer powder, polyimide polymer powder, polyethylene polymer powder, polyester polymer powder, polypropylene polymer powder and combinations thereof.

In another refinement of the method for manufacturing the foam for use in a lost-foam casting process, the foam having a void fraction less than ninety five percent, the coating the polymer foam with an adhesive step may comprise applying an emulsion to the polymer foam, and the emulsion may comprise an adhesive polymer and solvent.

In another refinement of the method for manufacturing the foam for use in a lost-foam casting process, the foam having a void fraction less than ninety five percent, the method may further include the process of removing excess solvent from the polymer foam before applying a particulate material to the adhesive.

In another refinement of the method for manufacturing the foam for use in a lost-foam casting process, the foam having a void fraction less than ninety five percent, the method may further include wherein the polymer foam comprises ligaments positioned between nodes, and further comprising heating the foam to a temperature above the melting temperature of the particulate material, followed by cooling the foam to a temperature below the melting temperature of the particulate material to form a substantially continuous coating of particulate material over the ligaments.

In another refinement of the method for manufacturing the foam for use in a lost-foam casting process, the foam having a void fraction less than ninety five percent, the applying a particulate material to the adhesive may include passing the adhesive coated polymer foam through a fluidized bed of particulate material.

In accordance with another embodiment of the present disclosure, a method for manufacturing a fan blade for a gas turbine engine is disclosed. The method may include, providing polymer foam having an open-cell structure and a void fraction greater than ninety five percent, followed by coating the polymer foam with an adhesive to create adhesive coated foam. In a next step, a particulate material may be applied to the adhesive coated foam to make a modified foam having a void fraction less than or equal to ninety five percent. Then, the modified foam having a void fraction less than or equal to ninety five percent may be covered with a refractory material, and then this refractory material may be cured until it hardens to form an investment. Next, the investment casting may be heated to a temperature above the boiling point of the modified foam having avoid fraction less than or equal to ninety five percent to form a negative of modified foam. Then, molten metal or metal alloy may be added to the negative, and the negative may be cooled to a temperature below the melting temperature of the metal or metal alloy to form a positive of the modified foam. In a next step, the refractory material may be removed to form an open-cell metal foam having a void fraction less than or equal to ninety five percent. Finally, the open cell metal foam having a void fraction less than or equal to ninety five percent may be enveloped with an outer shell of first material, the outer shell having the shape of an airfoil, to form a fan blade for a gas turbine engine.

In a refinement of the method for manufacturing the fan blade for a gas turbine engine, the polymer foam may be polyurethane polymer foam, the adhesive may be vinyl acetate, the particulate material may be polyethylene polymer powder and the metal or metal alloy may be aluminum.

In another refinement of the method for manufacturing the fan blade for a gas turbine engine, the outer shell of a first material may be made of a metal or metal alloy selected from the group consisting of aluminum, titanium and nickel, aluminum alloys, steel, nickel alloys and titanium alloys.

In another refinement of the method for manufacturing the fan blade for a gas turbine engine, the outer shell of a first material may be made of a composite material, and the composite material may be made fiber embedded in resin.

These and other aspects and features of the present disclosure will be more readily understood when read in conjunction with the accompanying drawings.

DETAILED DESCRIPTION OF THE DISCLOSURE

Figure 1:
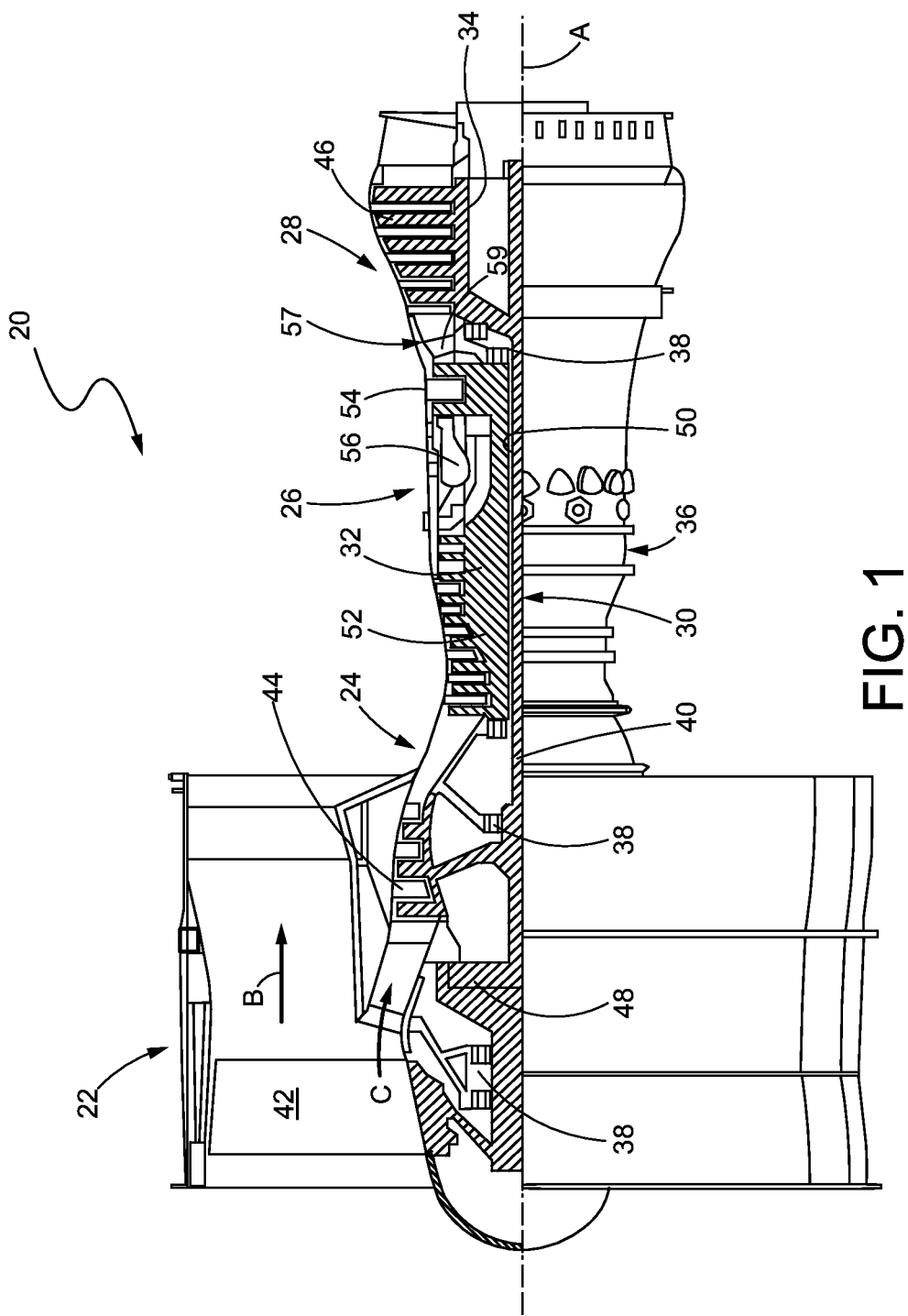
FIG. 1 is a side, partially cross-sectional view of a gas turbine engine constructed in accordance with the present disclosure.

Referring now to the drawings, and with specific reference to FIG. 1, a gas turbine engine is shown and generally referred to be reference numeral 20. The gas turbine engine 20 disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B, while the compressor section 24 drives air along a core flowpath C for compression and communication into the combustor section 26. As will be described in further detail herein, in the combustion section 26, the compressor air is mixed with fuel and ignited, with the resulting combustion gases then expanding in turbine section 28. Although depicted as a turbofan gas turbine engine in the disclosed non-limiting embodiment, it should be understood that the concepts described herein are not limited to use with turbofans as the teachings may be applied to other types of turbine engines including, but not limited to, three-spool architectures as well.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan blade assembly 42, a low pressure (or first) compressor section 44 and a low pressure (or first) turbine section 46. The inner shaft 40 is connected to the fan blade assembly 42 through a geared architecture 48 to drive the fan assembly 42 at a lower speed than the low speed spool 30. The high speed spool 32 includes an outer shaft 50 that interconnects a high pressure (or second) compressor section 52 and high pressure (or second) turbine section 54. The outer shaft 50 is typically concentric with and radially outward from the inner shaft 50. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes. As used herein, a "high pressure" compressor or turbine experiences a higher pressure than a corresponding "low pressure" compressor or turbine.

The core airflow C is compressed first by the low pressure compressor 44, and then by the high pressure compressor 52, before being mixed and burned with fuel in the combustor 56, and lastly expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a high-bypass engine a greater volume of air moves along a bypass flowpath B than through core airflow C. The ratio of the mass of air moving through bypass flowpath B to core airflow C is known as the bypass ratio. In a further example, the engine 20 bypass ratio is greater than about six (6), with an example embodiment being greater than ten (10), the geared architecture 48 is an epicyclic gear train, such as a star gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

Figure 2:
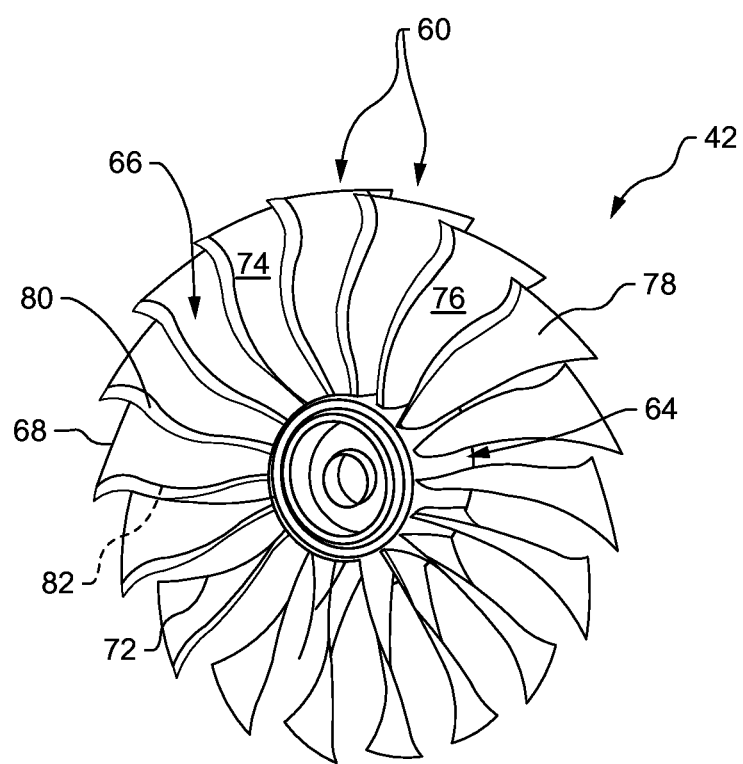
FIG. 2 is a perspective view of an exemplary gas turbine engine fan blade assembly that may be used in conjunction with the gas turbine engine of FIG. 1.
Figure 3:
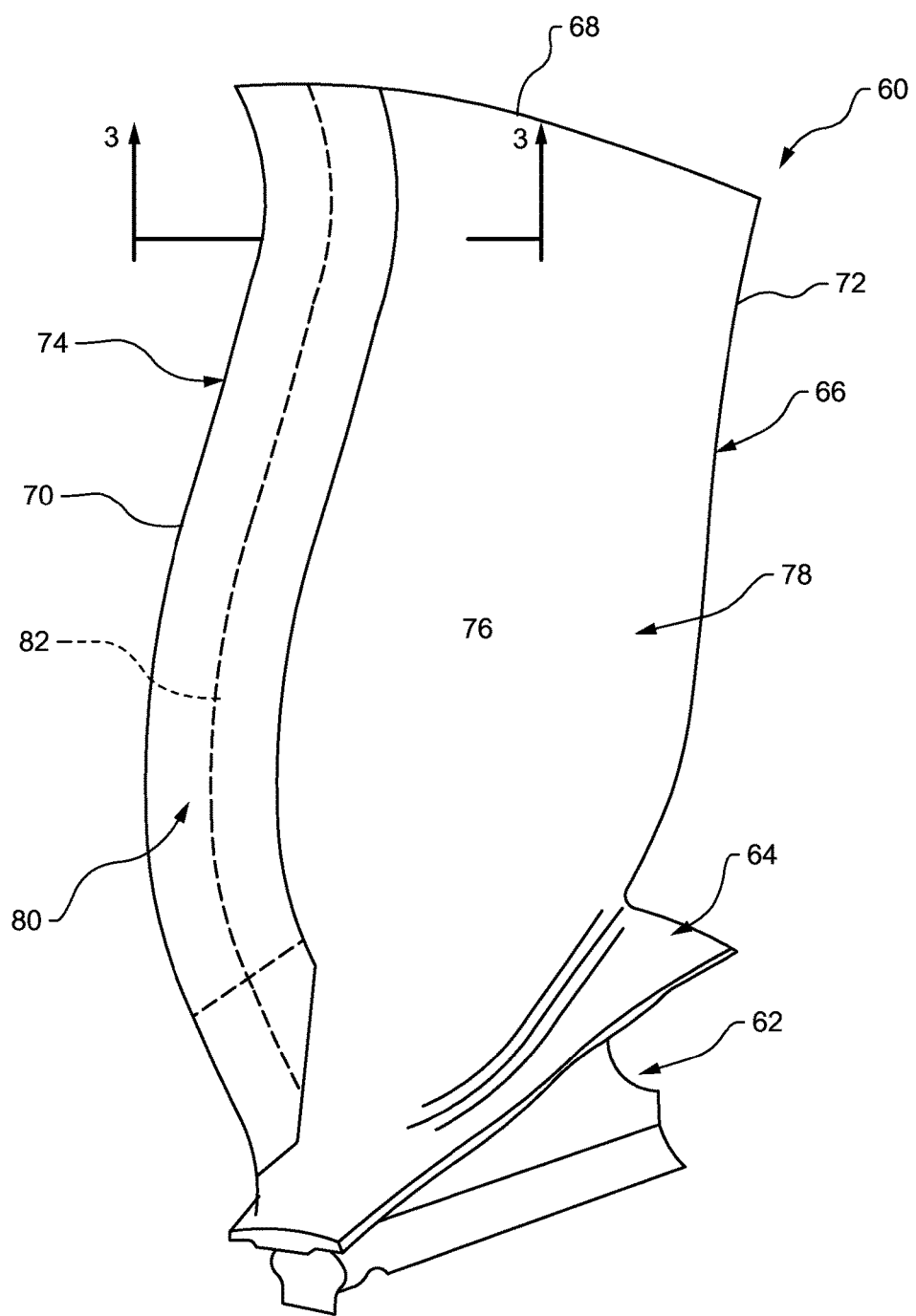
FIG. 3 is a perspective view of an exemplary fan blade that may be used in conjunction with the fan blade assembly of FIG. 2.

Referring to FIGS. 2 and 3, a fan blade 60 of the fan blade assembly 42 may include a root 62 supporting a platform 64. An airfoil 66 may extend from the platform 64 to a tip 68. The airfoil 66 includes spaced apart leading and trailing edges 70, 72. Pressure and suction sides 74, 76 adjoin the leading and trailing edges 70, 72 to provide a fan blade contour 78. In certain embodiments the fan blade includes a leading edge sheath 80. The sheath 80 is secured to the fan blade 60 over the edge 82. In one example, the sheath 80 is constructed from titanium. In another example, the sheath 80 is made from titanium alloy. It should be understood that other metals or materials may be used for sheath 80.

Figure 4:
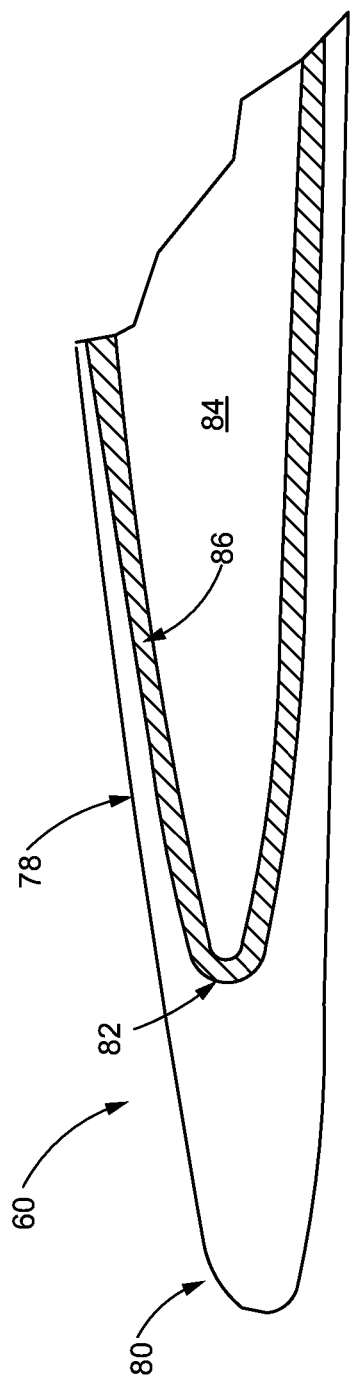
FIG. 4 is a cross-sectional view of the exemplary fan blade that may be used in conjunction with the fan blade assembly of FIG. 2 taken along line 3-3 of FIG. 3.

Now with reference to FIGS. 3-4, in one aspect of the present disclosure, the fan blade 60 may include a core 84 of open-cell reticulated metal foam enveloped by an outer shell 86 of a first material. Although other configurations are possible, in one embodiment the core 84 may extend from the about the tip 68 to about the root 62. Similarly, the core 84 may extend from about the leading edge 70 to about the trailing edge 72. Furthermore, in an additional embodiment, the fan blade may include a second core (not shown) being made of the first material surrounded by the shell 86.

The open-cell reticulated metal foam of the core 84 may be made of a metal or a metal alloy. Although other metals are certainly possible, some metals from which the open-cell reticulated metal foam core 84 may be made consists of aluminum, titanium, nickel, copper, lead, molybdenum, tin, zinc and combinations thereof. Some metal alloys from which open-cell metal foam of the core 84 may be made includes aluminum alloy, nickel alloy, titanium alloy, steel and combinations thereof. Examples of metal alloys from which the core 84 may be selected includes aluminum alloys, steel, nickel alloys and titanium alloys, such as series 2000, 6000 or 7000 aluminum, 300 and 400 series stainless steels, precipitation hardenable stainless steels, Ti-6Al-4V, Ti-6Al-2Sn-4Zr-2Mo, WASPALOY®, INCONEL 718®, INCONEL 718+®, INCONEL 939® or HAYNES 282®. Other metal alloys are certainly possible.

In one design, the first material comprising the outer shell 86 may be a metal or a metal alloy. While the following list is not meant to be exhaustive, the metal from which outer shell 86 may be made includes, but is not limited to, aluminum, titanium and nickel. Some examples of metal alloys from which the outer shell 86 may be selected includes aluminum alloys, steel, nickel alloys and titanium alloys, such as series 2000, 6000 or 7000 aluminum, 300 and 400 series stainless steels, precipitation hardenable stainless steels, Ti-6Al-4V, Ti-6Al-2Sn-4Zr-2Mo, WASPALOY®, INCONEL 718®, INCONEL 718+®, INCONEL 939® or HAYNES 282®.

In another design, the first material comprising the outer shell 86 may be a composite material. Such composite material may be made of fiber embedded in resin. Some examples of the fibers from which the composite material may be made include, carbon-fiber, poly(p-phenylene-2,6-benzobisoxazole) fiber, mullite fiber, alumina fiber, silicon nitride fiber, silicon carbide fiber, boron fiber, boron nitride fiber, boron carbide fiber, glass fiber, titanium diboride fiber, yttria stabilized zirconium fiber and combinations thereof. Other fibers are certainly possible.

The resin of such composite material may be a thermoset resin or a thermoplastic resin. Examples of resins from which the composite material may be made includes, but is not limited to, polyester, thermoset urethane, cyanate ester, vinyl ester, polyimide, bisphenol A epoxy, bisphenol F epoxy, novolac epoxy, glycidyl epoxy, cycloaliphatic epoxy, glycidylamine epoxy, melamine, phenol formaldehyde, polyhexahydrotriazine, low density polyethylene, medium density polyethylene, high density polyethylene, ultra-high molecular weight polyethylene, polyvinyl chloride, polyethylene terephthalate, vinyl, polypropylene, poly(methyl methacrylate), nylon, polybenzimidazole, polystyrene, polytetrafluroethylene, polyetherimide, polyether ketone, polyether ether ketone, acrylonitrile butadiene styrene, styrene acrylonitrile, acrylonitrile styrene acrylate, polyamide, polyaryl ether ketone, polycarbonate, polyoxymethylene, polyphenylene ether, polyphenylene sulfide, polysulfone, polybutylene terephthalate and combinations thereof.

Figure 5:
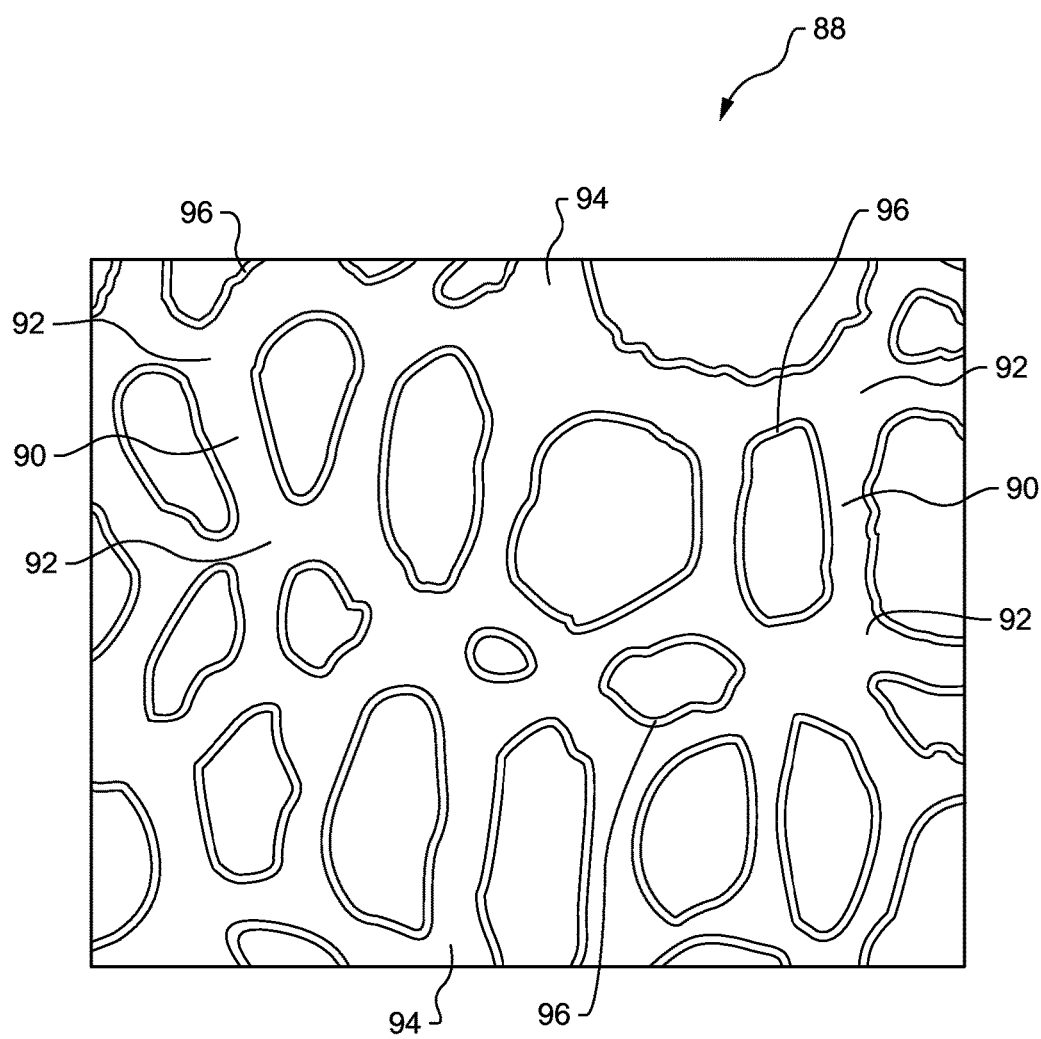
FIG. 5 is a schematic illustration depicting open-cell polymer foam for use in the manufacture of open-cell reticulated metal foam, the open-celled reticulated metal foam able to be used in the manufacture of the exemplary fan blade depicted in FIGS. 3-4.

Now with reference to FIGS. 5-6(*a-b*), foam for use in a lost-foam casting process, such as during the creation of open-cell reticulated metal foam for gas turbine engine fan blades 60, for example, is generally referred to by the reference number 88. Generally speaking, such foam 88 may have a reticulated three-dimensional structure comprising one or more ligaments 90 extending between two or more nodes 92. Being a three-dimensional structure, a ligament 90 may extend between two or more nodes 92 out of the same plane.

Now turning specifically to FIG. 5, such foam 88 may comprise a first layer 94 made of polymer foam having a void fraction greater than or equal to ninety five (95) percent. While other polymer foams are certainly possible, some polymer foams from which the first layer 94 may be made includes polyurethane polymer foam, polyvinyl chloride polymer foam, polystyrene polymer foam, polyimide polymer foam, silicone polymer foam, polyethylene polymer foam, polyester polymer foam, polypropylene foam and combinations thereof. While such first layer 94 may have a void fraction of ninety five (95) percent or greater, in another instance such layer 94 may have a void fraction greater than ninety six (96) percent. In further instances, the first layer may have a void fraction greater than ninety seven (97) percent, or even ninety eight (98) percent.

As demonstrated in FIG. 5, such foam may further include a second layer 96, and such second layer 96 may be adhered to the first layer 94. Such second layer 96 may be an adhesive, such as an adhesive polymer. Some adhesive polymers from which the second layer may be made includes, but is certainly not limited to, acrylic polymer, alkyd polymer, styrene acrylic polymer, styrene butadiene polymer, vinyl acetate polymer, vinyl acetate homopolymer polymer, vinyl acrylic polymer, vinyl maleate polymer, vinyl versatate polymer, vinyl alcohol polymer, polyvinyl chloride polymer, polyvinylpyrrolidone polymer, casein and combinations thereof.

Figure 6A:
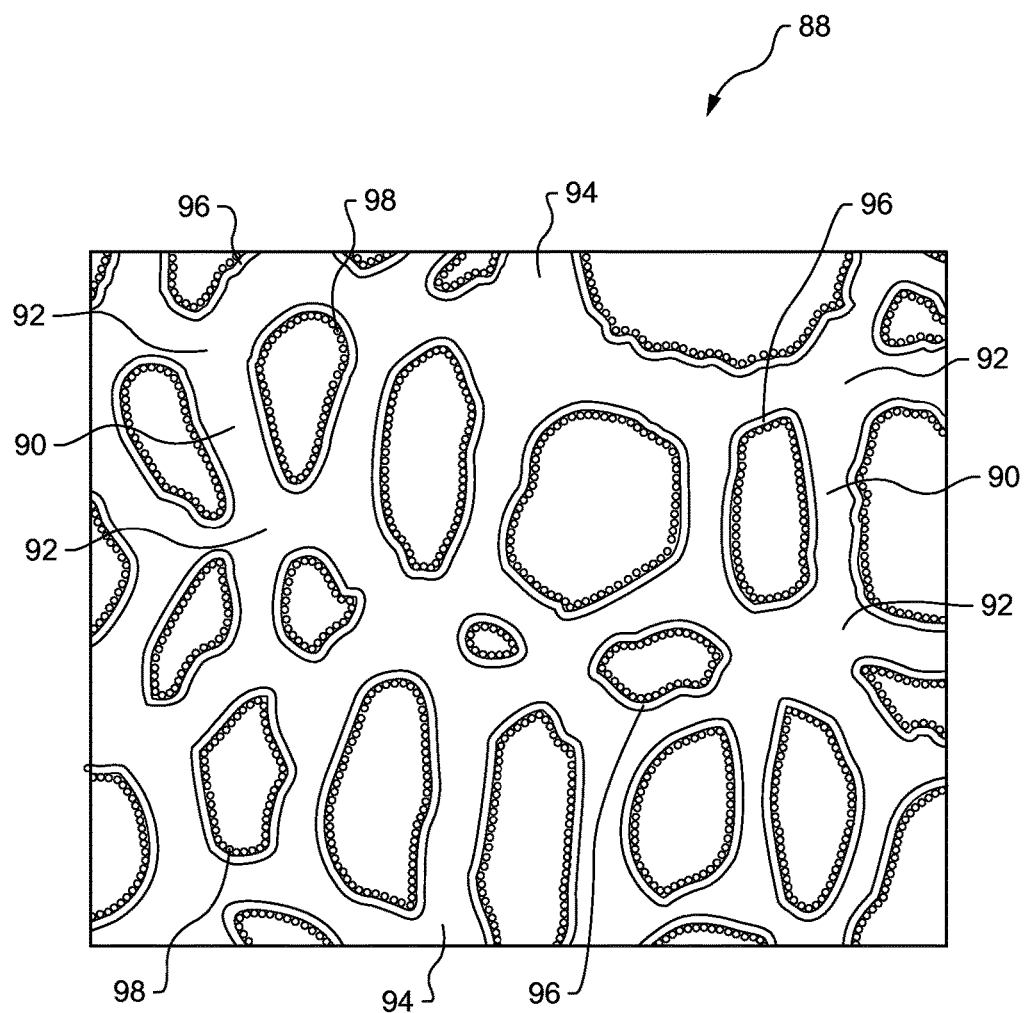
FIGS. 6(a-b) are schematic illustrations depicting two modified, open-cell polymer foams for use in the manufacture of open-cell reticulated metal foam, the open-cell reticulated metal foam able to be used in the manufacture of the exemplary fan blade depicted in FIGS. 3-4.

Such foam 88 may additionally include a third layer 98 adhered to the second layer 96 as depicted in FIGS. 6(*a-b*). While specifically referring to FIG. 6*a*, it is seen that such third layer 98 may be comprised of a particulate material. Such particulate material from which the third layer 98 may be made includes wax powder, wood flour, polymer powder and combinations thereof. Some wax powders from which the third layer 98 may be manufactured includes, animal wax powder, vegetable wax powder, mineral wax powder, petroleum wax powder and combinations thereof. Polymer powders from which the third layer 98 may be made includes polyurethane polymer powder, polyvinyl chloride polymer powder, polystyrene polymer powder, polyimide polymer powder, polyethylene polymer powder, polyester polymer powder, polypropylene polymer powder and combinations thereof. Certainly, other polymer powders may be utilized to manufacture the third layer 98 of the foam 88 for use in the creation of the open-celled metal foam for gas turbine engine fan blades 60.

Such foam 88, comprising the first layer 94, second layer 96 adhered to the first layer 94 and third layer 98 adhered to the second layer 94 may have void fraction less than or equal to ninety five (95) percent. In another instance, such foam 88 may have void fraction less than or equal to ninety four (94) percent. In a further instance, such foam 88 may have void fraction less than or equal to ninety three (93) percent. In further instances, such foam 88 comprising the first layer 94, second layer 96 adhered to the first layer 94 and third layer 98 adhered to the second layer 94 may have void fraction less than or equal to ninety two (92) percent, ninety one (91) percent or even ninety (90) percent.

Figure 6B:
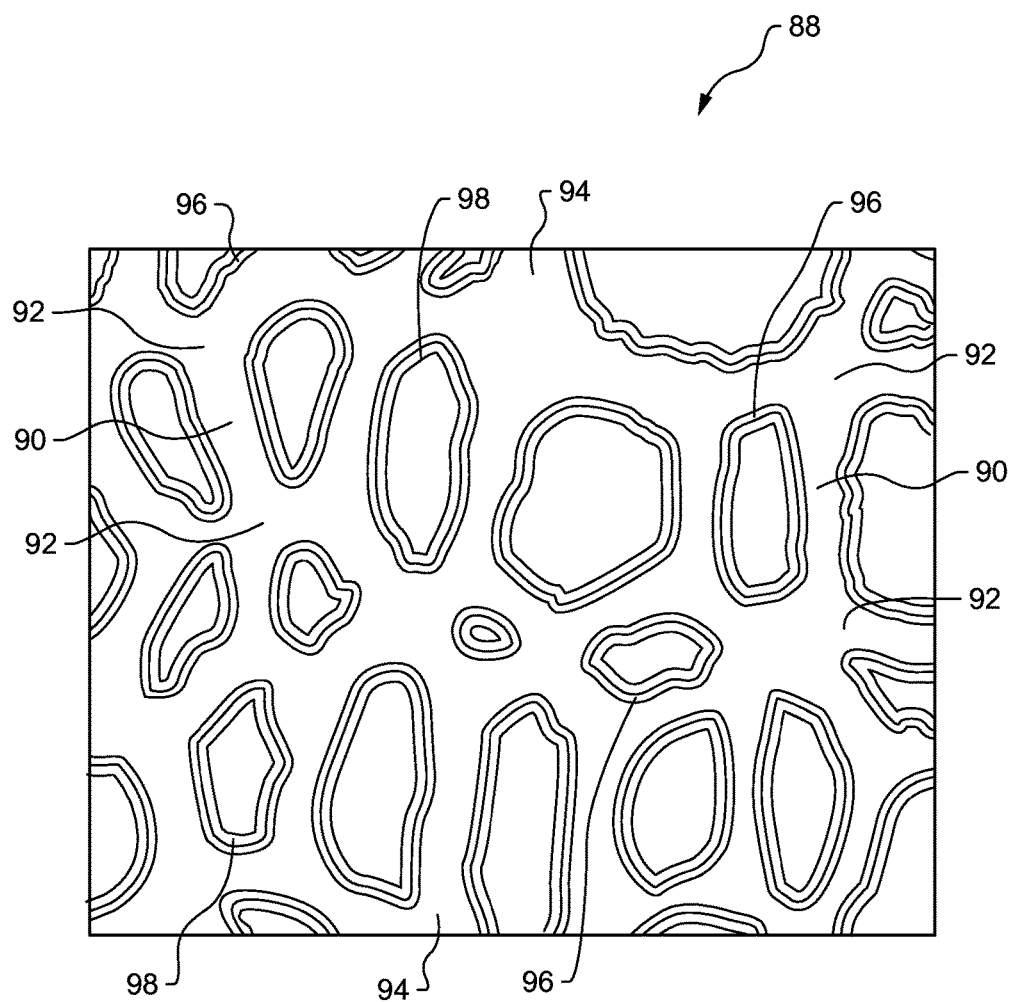

Turning now to FIG. 6*b*, a modification of the foam 88 comprising the first layer 94, second layer 96 adhered to the first layer 94 and third layer 98 adhered to the second layer 94, is depicted. As seen there, the third layer 98 may be characterized as being a substantially more continuous, non-particulate, shaped coating. This third layer 98 may take on such continuous, non-particulate, shaped characteristic upon the exposing the particulate matter of the third layer 98 to heat energy that is at or above the melting temperature of the particulate matter. That is, the particulate matter melts, and subsequently upon cooling, forms a substantially continuous coating of melted particulate matter over the ligaments 90 and nodes 92 of the foam 88. Like the foam 88 having a more particulate shaped third layer 98 depicted in FIG. 6*a*, this foam 88 with a more continuous third layer 98 may have a void fraction less than or equal to ninety five (95) percent. In another instance, such foam 88 may have void fraction less than or equal to ninety four (94) percent. In a further instance, such foam 88 may have void fraction less than or equal to ninety three (93) percent. In further instances, such foam 88 comprising the first layer 94, second layer 96 adhered to the first layer 94 and third layer 98 adhered to the second layer 94 may have void fraction less than or equal to two percent (92), ninety one (91) percent or even ninety (90) percent.

While not depicted in FIGS. 5-6(*a-b*), such foam 88 may additionally include a fourth layer comprising an adhesive adhered to the third layer. Such adhesive may be an adhesive polymer and may be selected from the list of adhesives described above. Alternatively, such adhesive may be a different adhesive polymer altogether. Further, such foam 88 may additionally comprise a fifth layer adhered to the fourth layer. Such fifth layer may be a particulate material and the particulate material may be a powder selected from such materials described of this application. Certainly other particulate materials are possible. Additional adhesive and particulate material layers may be added as needed so that the void fraction of the foam 88 for use in a lost foam casting process is less than or equal to ninety five (95) percent.

Figure 7:
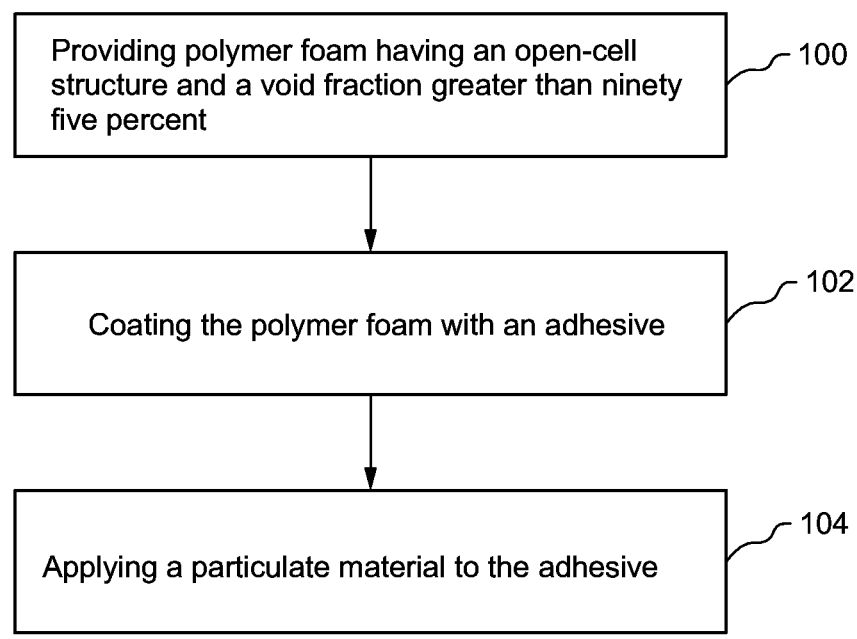
FIG. 7 is a flowchart depicting an exemplary method for preparing a modified, open-cell reticulated foam for use in the manufacture of an open-cell reticulated metal foam, the open-cell reticulated metal foam able to be used in the manufacture of the exemplary fan blade depicted in FIGS. 3-4.

Turning now to FIG. 7, steps to a method of manufacturing foam 88 for use in a lost-foam casting process, the foam 88 having a void fraction less than or equal to ninety five (95) percent, are illustrated. At a step 100, polymer foam having an open-cell structure and a void fraction greater than ninety five (95) percent may be provided. Such polymer foam may be selected, for example, from the group consisting of polyurethane polymer foam, polyvinyl chloride polymer foam, polystyrene polymer foam, polyimide polymer foam, silicone polymer foam, polyethylene polymer foam, polyester polymer foam, polypropylene foam and combinations thereof. At a step 102, the polymer foam may be coated with an adhesive. Such adhesive may be an adhesive polymer, for instance, and may be selected from the group consisting of acrylic polymer, alkyd polymer, styrene acrylic polymer, styrene butadiene polymer, vinyl acetate polymer, vinyl acetate homopolymer polymer, vinyl acrylic polymer, vinyl maleate polymer, vinyl versatate polymer, vinyl alcohol polymer, polyvinyl chloride polymer, polyvinylpyrrolidone polymer, casein and combinations thereof. Certainly, other adhesive polymers are possible. At a step 104, a particulate material may be applied to the adhesive, and the particulate material may be chosen from the group consisting of wax powder, wood flour, polymer powder and combinations thereof. Further, the wax powder may be selected from the group consisting of animal wax powder, vegetable wax powder, mineral wax powder, petroleum wax powder and combinations thereof. If a polymer powder is chosen, it may be selected from the group consisting of polyurethane polymer powder, polyvinyl chloride polymer powder, polystyrene polymer powder, polyimide polymer powder, polyethylene polymer powder, polyester polymer powder, polypropylene polymer powder and combinations thereof. Additionally, such particulate material may be applied by passing the adhesive coated polymer foam through a fluidized bed of particulate material.

When coating the polymer foam with an adhesive at step 102, such step may comprise applying an emulsion to the polymer foam. Such emulsion may comprise any of the foregoing described adhesive polymers dispersed in a solvent. Further, such step may further include removing the excess solvent from the polymer foam before applying a particulate material to the adhesive.

In an addition to the process described above, the polymer foam comprises ligaments positioned between nodes, and may further comprise heating the foam to a temperature above the melting temperature of the particulate material, followed by cooling the foam to a temperature below the melting temperature of the particulate material, to form a substantially continuous coating of particulate material over the ligaments.

In an optional additional step, the third layer may be coated with a fourth layer, the fourth layer comprising an adhesive. Such adhesive may be an adhesive polymer selected from the list described above, but other adhesive polymers are certainly possible. Then, such fourth layer may be coated with a fifth layer comprising particulate material. Such particulate material may be a powder chosen from those described above, although other materials are possible. Additionally, such foam 88 may be coated with additional adhesive and particulate material layers beyond the fourth and fifth layer until the void fraction of the foam 88 for use in a lost-foam casting process is less than or equal to ninety five (95) percent.

Figure 8:
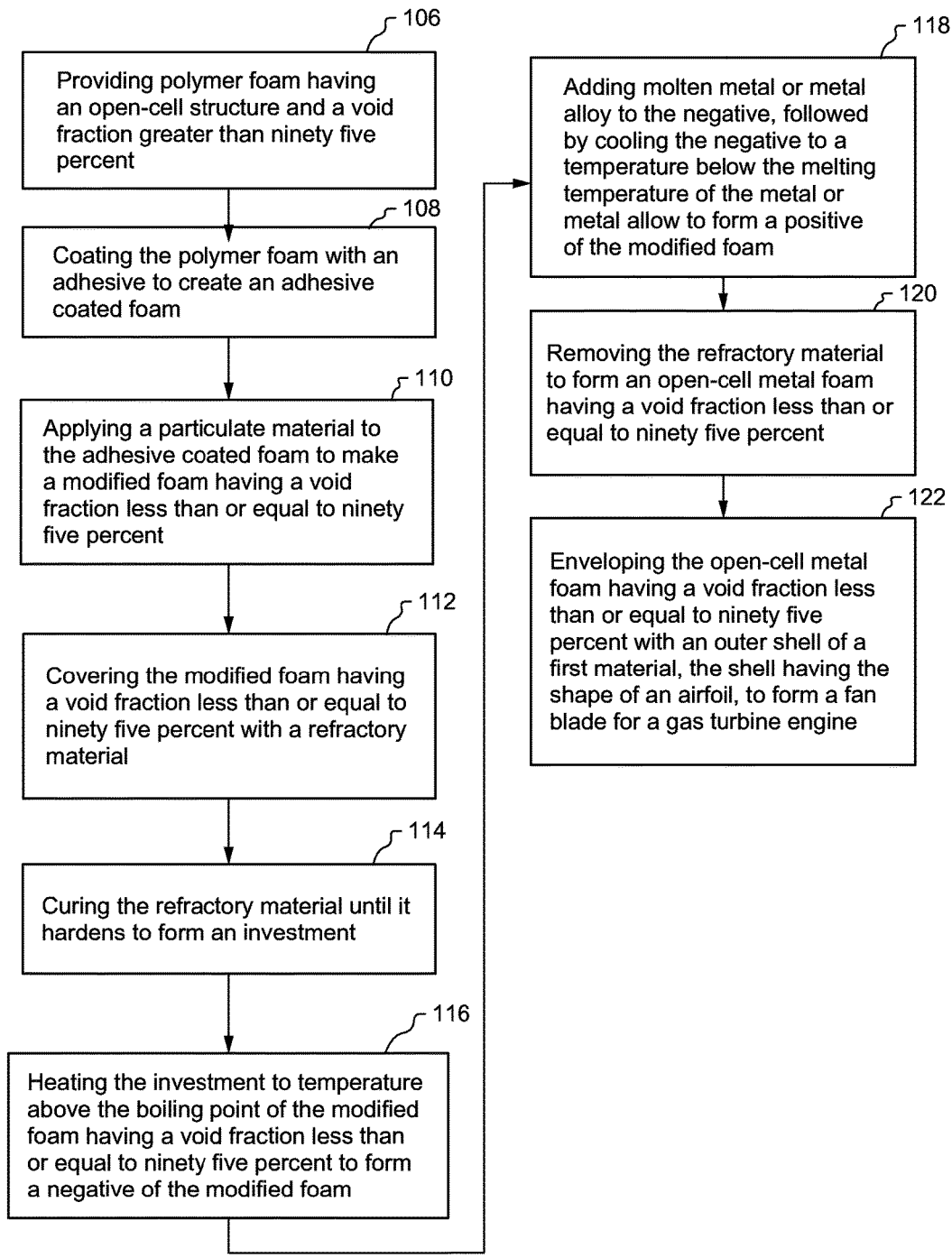
FIG. 8 is a flowchart depicting an exemplary method for preparing the exemplary fan blade depicted in FIGS. 3-4 utilizing the open-cell polymer foams of FIGS. 5-6 in a lost-foam casting process.

Referring next to FIG. 8, steps to a method of manufacturing a fan blade 60 for a gas turbine engine 20 are depicted. At a step 106, polymer foam having an open-cell structure and a void fraction greater than ninety five (95) percent may be provided. At a step 108, the polymer foam may be coated with an adhesive to create adhesive coated foam. At a step 110, particulate material may be applied to the adhesive coated foam to make a modified foam having a void fraction less than or equal to ninety five (95) percent. At a step 112, the modified foam having a void fraction less than or equal to ninety five (95) percent may covered with a refractory material. At a step 114, the refractory material may be cured until it hardens and forms an investment. At a step 116, the investment may be heated to a temperature above the boiling point of the modified foam having a void fraction less than or equal to ninety five (95) percent to form a negative of the modified foam. At a step 118, molten metal or metal alloy may be added adding to the negative, followed by cooling the negative to a temperature below the melting temperature of the metal or metal alloy to form a positive of the modified foam. At a step 120, the refractory material may be removed to form an open-cell metal foam having a void fraction less than or equal to ninety five (95) percent. At a step 122, the open-cells metal foam having a void fraction less than or equal to ninety five (95) percent may be enveloped with an outer shell of a first material, the out shell having the shape of an airfoil, to form a fan blade for a gas turbine engine.

In one instance of the foregoing method, the polymer foam is polyurethane polymer foam, the adhesive is vinyl acetate, the particulate material is polyethylene polymer powder and the metal or metal alloy is aluminum. Further, the outer shell of first material may be made of a metal or metal alloy that is from the group consisting of aluminum, titanium and nickel, aluminum alloys, steel, nickel alloys and titanium alloys. Alternatively, the outer shell of first material may be made of a composite material and this composite material may comprise fiber embedded in resin.

INDUSTRIAL APPLICABILITY

In operation, foam for use in a lost-foam casting process can find use in many industrial applications, such as in the creation of open-cell reticulated metal foams for use in gas turbine engine fan blades. More specifically, the foam may find use as a positive in the lost-foam casting process for open-cell reticulated metal foams. The void fraction of foam utilized in such process is typically ninety seven (97) percent. While not conclusive, data suggests that gas turbine engine fan blades comprising open-cell reticulated metal foam manufactured from the above-described foams lack the resilience necessary for use in such fan blades.

Accordingly, the current application describes foam that can be used in a lost-foam casting process to create open-cell reticulated metal foam with a lesser void fraction. Such foam may include a first layer comprising a polymer foam having a void fraction greater than ninety five (95) percent, a second layer comprising an adhesive adhered to the first layer and a third layer of particulate material adhered to the third layer. Such foam, having these three layers, has a void fraction that is less than or equal to ninety five (95) percent and therefore may be used in a lost-foam casting process to create an open-cell reticulated metal foam having the necessary resilience to be used in gas turbine engine fan blades. Additionally, methods are described to manufacture such foam having three layers with the necessary void fraction. Further, methods are described to create a fan blade for a gas turbine engine utilizing the afore-described foam having three layers with the necessary void fraction.

The above description is meant to be representative only, and thus modifications may be made to the embodiments described herein without departing from the scope of the disclosure. Thus, these modifications fall within the scope of present disclosure and are intended to fall within the appended claims.

What is claimed is:

1. A method of manufacturing a fan blade for a gas turbine engine, comprising:
   providing a polymer foam having an open-cell structure and a void fraction greater than ninety five percent;
   coating the polymer foam with an adhesive to create an adhesive coated foam; applying a particulate material to the adhesive coated foam to make a modified foam having a void fraction less than or equal to ninety five percent;
   covering the modified foam having a void fraction less than or equal to ninety five percent with a refractory material;
   curing the refractory material until it hardens to form an investment;
   heating the investment to a temperature above the boiling point of the modified foam having a void fraction less than or equal to ninety five percent to form a negative of the modified foam;

adding molten metal or metal alloy to the negative, followed by cooling the negative to a temperature below the melting temperature of the metal or metal alloy to form a positive of the modified foam;

removing the refractory material to form an open-cell metal foam having a void fraction less than or equal to ninety five percent; and enveloping the open-cell metal foam having a void fraction less than or equal to ninety five percent with an outer shell of a first material, the outer shell having the shape of an airfoil, to form a fan blade for a gas turbine engine.

2. The modified foam according to claim 1, wherein the polymer foam is one of polyurethane polymer foam, polyvinyl chloride polymer foam, polystyrene polymer foam, polyimide polymer foam, silicone polymer foam, polyethylene polymer foam, polyester polymer foam, polypropylene foam and combinations thereof.

3. The foam according to claim 1, wherein the adhesive is an adhesive polymer one of acrylic polymer, alkyd polymer, styrene acrylic polymer, styrene butadiene polymer, vinyl acetate polymer, vinyl acetate homopolymer polymer, vinyl acrylic polymer, vinyl maleate polymer, vinyl versatate polymer, vinyl alcohol polymer, polyvinyl chloride polymer, polyvinylpyrrolidone polymer, casein and combinations thereof.

4. The foam according to claim 1, wherein the particulate material is one of wax powder, wood flour, polymer powder and combinations thereof.

5. The foam according to claim 4, wherein the wax powder is one of animal wax powder, vegetable wax powder, mineral wax powder, petroleum wax powder and combinations thereof.

6. The foam according to claim 4, wherein the polymer powder is one of polyurethane polymer powder, polyvinyl chloride polymer powder, polystyrene polymer powder, polyimide polymer powder, polyethylene polymer powder, polyester polymer powder, polypropylene polymer powder and combinations thereof.

7. The method of manufacturing the foam according to claim 1, wherein the coating the polymer foam with an adhesive step comprises applying an emulsion to the polymer foam, the emulsion comprising an adhesive polymer and solvent.

8. The method of manufacturing the foam according to claim 7, further comprising removing excess solvent from the polymer foam before applying a particulate material to the adhesive.

9. The method of manufacturing the foam according to claim 1, wherein the applying a particulate material to the adhesive includes passing the adhesive coated polymer foam through a fluidized bed of particulate material.

10. The method for manufacturing the fan blade according to claim 1, wherein the polymer foam is polyurethane polymer foam, the adhesive is vinyl acetate, the particulate material is polyethylene polymer powder and the metal or metal alloy is aluminum.

11. The method for manufacturing the fan blade according to claim 1, wherein the outer shell of a first material is made of a metal or metal alloy selected from the group comprising; aluminum, titanium and nickel, aluminum alloys, steel, nickel alloys and titanium alloys.

12. The method of manufacturing the fan blade according to claim 1, wherein the outer shell of a first material is made of a composite material, and the composite material is made of fiber embedded in resin.

* * * * *

UNITED STATES PATENT AND TRADEMARK OFFICE
CERTIFICATE OF CORRECTION

PATENT NO. : 10,035,174 B2
APPLICATION NO. : 14/617291
DATED : July 31, 2018
INVENTOR(S) : Ryan B. Noraas and Steven J. Bullied Page 1 of 1

It is certified that error appears in the above-identified patent and that said Letters Patent is hereby corrected as shown below:

In the Claims

In Column 11, Claim 2, Line 14 replace "modified foam" with "method of manufacturing the fan blade"
In Column 11, Claim 3, Line 20 replace "foam" with "method of manufacturing the fan blade"
In Column 11, Claim 4, Line 28 replace "foam" with "method of manufacturing the fan blade"
In Column 11, Claim 5, Line 31 replace "foam" with "method of manufacturing the fan blade"
In Column 12, Claim 6, Line 1 replace "foam" with "method of manufacturing the fan blade"
In Column 12, Claim 7, Line 7 replace "foam" with "fan blade"
In Column 12, Claim 8, Line 12 replace "foam" with "fan blade"
In Column 12, Claim 9, Line 16 replace "foam" with "fan blade"
In Column 12, Claim 10, Line 20 replace "for" with "of"
In Column 12, Claim 11, Line 25 replace "for" with "of"

Signed and Sealed this
Eighth Day of December, 2020

Andrei Iancu
*Director of the United States Patent and Trademark Office*